INVENTORS P. T. MAUZEY
G. G. SCHLANGER
C. J. VOTAW
H. M. ZYDNEY
BY RC Lipton
ATTORNEY United States Patent Office 3,427,590

Patented Feb. 11, 1969

3,427,590
PRIORITY AND REGULAR MESSAGE PICKUP FROM MULTISTATION LINE DATA STATION TRANSMITTERS

Peter T. Mauzey, New York, and Gabriel G. Schlanger, Bronx, N.Y., and Clarence J. Votaw, Elberon, and Herbert M. Zydney, Rumson, N.J., assignors to Bell Telephone Laboratories, Incorporated, Murray Hill, N.J., a corporation of New York Filed May 19, 1967, Ser. No. 639,799
U.S. Cl. 340—147 7 Claims
Int. Cl. H04q *11/20*

ABSTRACT OF THE DISCLOSURE

Station data message transmitters on a multistation line are sequentially polled by a master controller, each station responding thereto by indicating availability of a priority or regular message. The master controller starts each station transmitter having a priority message, stores the identity of the stations having regular messages and starts one of the station transmitters with a regular message after all priority messages have been collected.

*Field of invention*

This invention relates to multistation line data transmitter selection systems and, more particularly, to priority and regular message pickup from multistation line data station transmitters.

*Description of the prior art*

In data message switching and processing systems, a significant proportion of the data messages comprises only tens of words and, therefore, requires a relatively short time interval for transmission. Since the line time of the transmitter is short for each message, it is advantageous to connect groups of transmitters to a common party or multistation line. To preclude contention between the transmitters for the common line a master controller is utilized on the multistation line to collect and distribute the data messages. One example of a data collection system involves a master controller which sequentially polls the several data stations on the line to determine whether the stations have available messages. The master controller can thus start individual stations, eliminating contention between the several transmitters.

In systems of the above type it is often desirable to provide various levels of priority for the data messages to enable preferential treatment, such as early pickup. In accordance with one priority arrangement, the master controller provides a priority polling cycle for collecting high priority messages and a regular polling cycle for collecting low priority messages. Each polling cycle requires substantial transmission time, however, and since the data message transmission time has a relatively short duration, the high and low priority polling may occupy a duration which is greater than the cumulative transmission time of the data messages.

*Summary of the invention*

The object of this invention is to provide levels of priority for message pickup while concurrently reducing the time interval required for polling.

This invention contemplates a polling cycle wherein the master controller polls the several data stations on the multistation line and the stations, in turn, advise the master controller of the availability of both priority and regular messages.

It is a feature of this invention that during the polling cycle the master controller starts each station transmitter having a priority message and stores the identities of the stations which indicate the availability of regular messages. After the completion of the polling cycle, when all the priority messages have been collected, the master controller starts the station transmitter which has a regular message available by examining the stored identity.

It is a further feature of this invention that the master controller sends a transmiter start code to a responding station to selectively start the transmitter thereat when the station responds that a priority message is available and sends a poll code to the next successive station when the responding station responds that a regular message is available.

In accordance with the illustrative embodiment of this invention, described hereinafter, the master controller, after sending the polling code, converts this code to a start code in the event that the station has a priority message available. Alternatively, the master controller stores the polling code in the event that the station responds that a regular message is available, proceeding to poll the next station if the prior station has either a regular message available or no message available, and, finally, converting the stored poll code to the start code of the corresponding station after all priority messages are picked up.

The foregoing and other objects and features of this invention will be fully understood from the following detailed description of an illustrative embodiment thereof taken in conjunction with the accompanying drawing.

*Detailed description*

Figure 1:
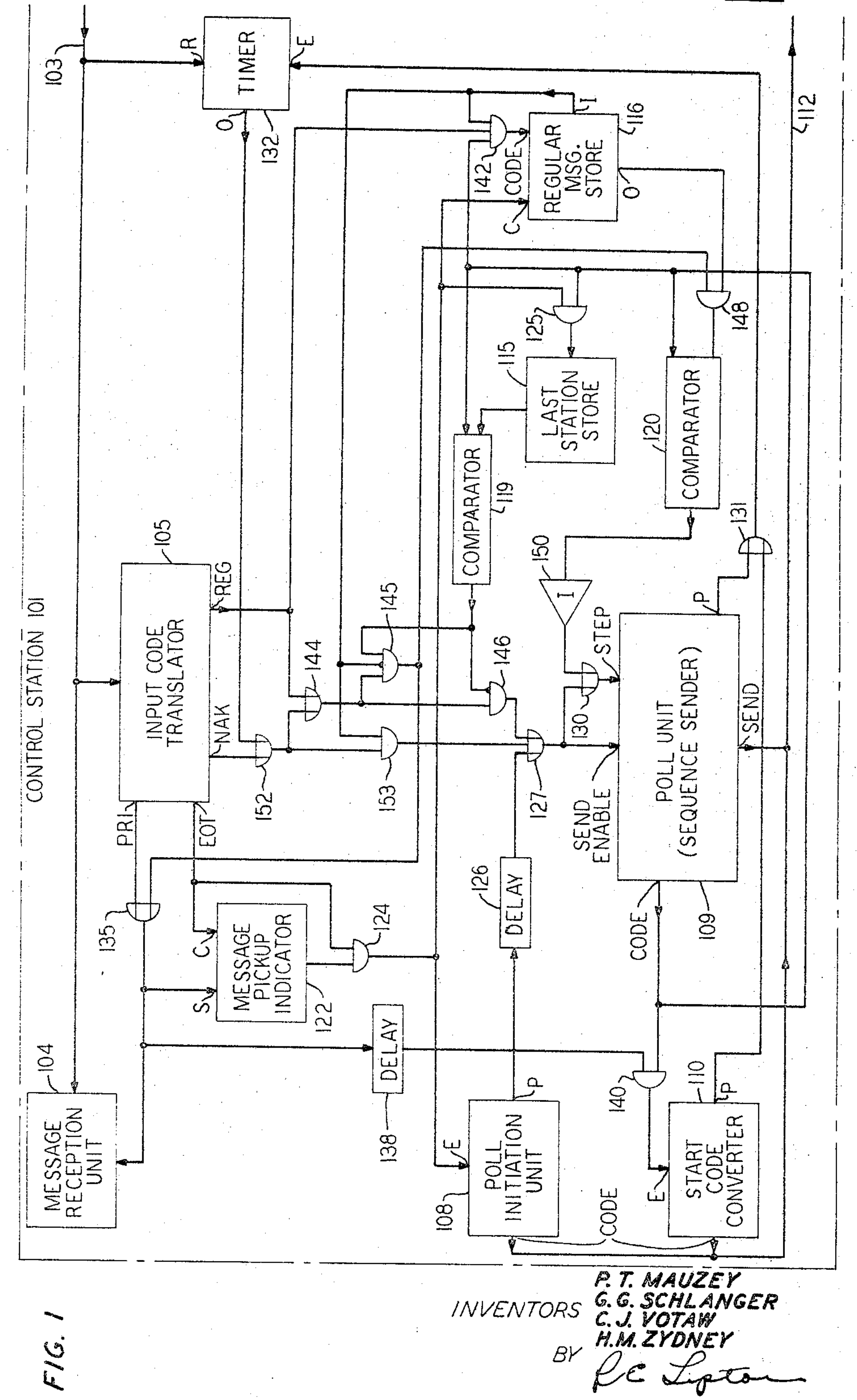
FIGS. 1 and 2 which, when arranged side by side, disclose a block diagram in schematic form of multistation line including a master controller and a plurality of outlying stations in accordance with this invention.
Figure 2:
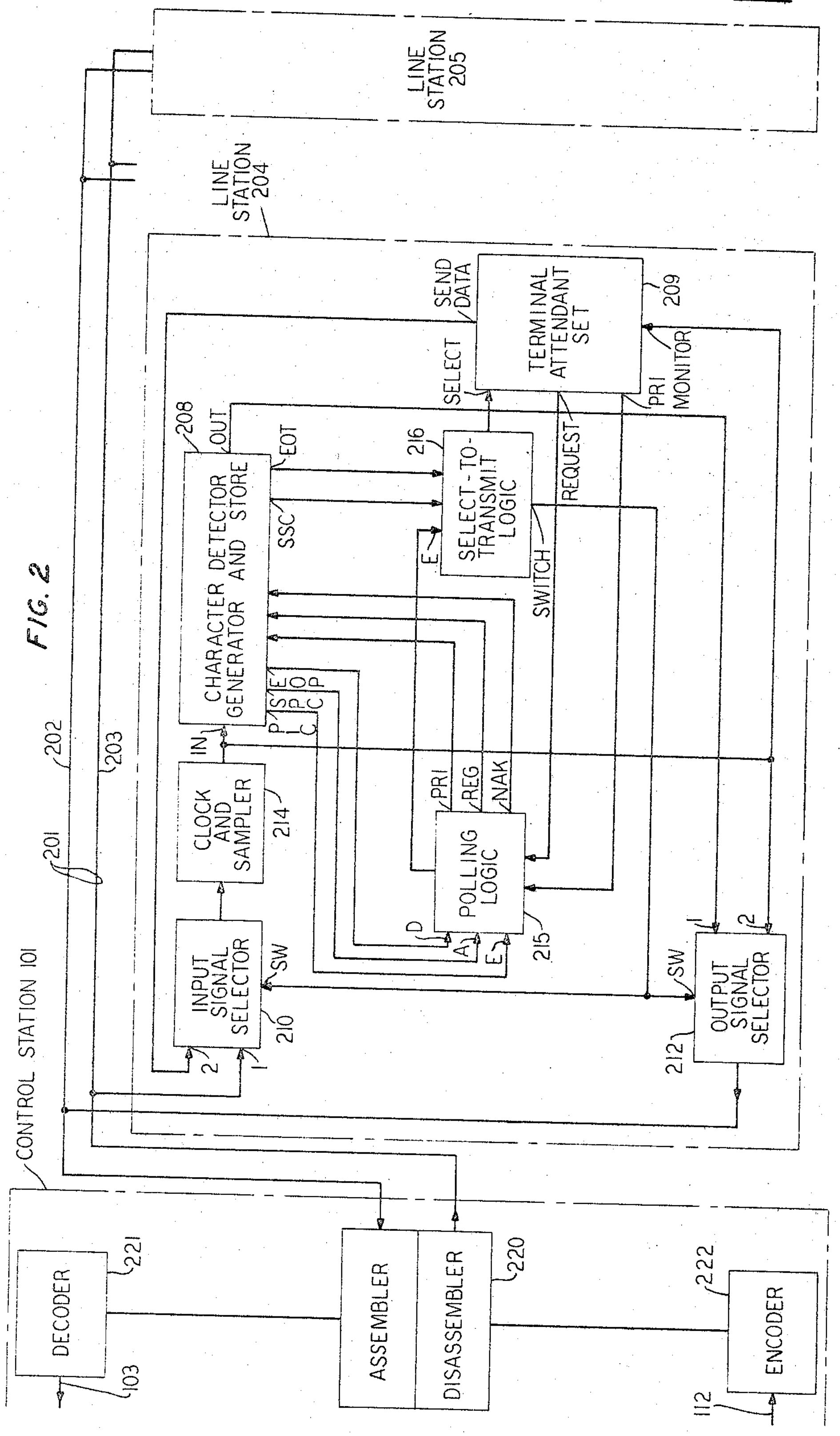

Referring now to the drawing, a control station is generally indicated in FIGS. 1 and 2 by block 101 and a data transmission line is shown extending from control station 101 and identified as line 201. In this disclosure the transmission line is shown as a metallic pair constituting lead 202, which provides data to control station 101, and lead 203, which conveys data from control station 101. Transmission line 201 extends to a plurality of remote line stations, such as line station 204 and line station 205.

In general, control station 101 functions to poll the line stations to determine whether they have message traffic to send, start line station transmitters which have priority messages to send, start a selected line station transmitter which has a regular message to send, and receive and record the several messages. The system, including control station 101 and the several line stations, is arranged to provide message pickup, which is controlled by a predetermined sequential polling of the line stations and the information derived therefrom, whether or not they have messages to transmit and whether or not the message is a priority or a regular message. In accordance therewith control station 101 will pick up a message from one of the line stations and, at the end of the message, start a polling sequence by sending a poll initiation code to the several line stations, placing them in the polling condition. At the same time, control station 101 stores the identity of the line station which has just transmitted the message to control station 101.

After placing the line stations in the polling condition, control station 101 proceeds to send a polling code to the next consecutive station, i.e., next consecutive with respect to the station which has just sent the message. The remote line station which is polled responds by returning an answer-back code, indicating whether there is a message thereat and whether the message is a regular or a priority message.

In the event that the message is a priority message, control station 101 sends the start code for the line station to start the transmitter thereat and, in addition, transmits an end-of-polling code whereby all line stations are taken out of the polling condition and cease to look for the polling codes. The selected line station proceeds to send its message, terminating by an end-of-message signal. This message is recorded at control station 101 and the end-of-message signal is recognized, whereupon a new polling cycle is initiated and the identity of the line station which sent the message is stored. It is noted here that this identity is stored to enable control station 101 to determine when a complete sequential polling of the line stations is completed without picking up a priority message.

Assuming now that in response to the polling code a line station responds that it has a regular message to send, the identity of the first outlying station to so respond is stored by control station 101 but the message is not picked up. Instead, polling continues with control station 101 polling the next sequential line station. Similarly, if a line station responds that it has no message to send, the next sequential line station is polled for message traffic. In this manner polling continues, with each line station being polled for traffic and the messages being picked up when the line station indicates that it has a priority message.

Assuming now that all of the stations are polled with none having priority messages, and, further assuming that at least one polled station has indicated that it has a regular message, control station 101 recognizes that a complete polling has been fulfilled since it has stored the identity of the last station to send a message and further recognizes that a station has a regular message since its identity is also stored at control station 101. Accordingly, at this time control station 101 sends the start code of a station which has the regular message, accepts the regular message and at the end thereof institutes a new polling cycle.

Poll unit 109, FIG. 1, provides the predetermined sequence of polling codes and comprises a conventional code generating unit having a plurality of positions and when at each position presents a corresponding polling code to the output CODE terminal. When energized by way of the input lead connected to input terminal STEP, poll unit 109 steps to the next position to present the next poll code in the predetermined sequence to the output CODE terminal. These codes are also presented to the output SEND terminal when the input lead connected to terminal SEND ENABLE is energized. It is noted that although single output leads are shown in FIG. 1, a plurality of leads may be utilized to convey the elements of the output data code in parallel. Accordingly, these output leads may be considered groups of parallel leads, each lead in the group arranged to convey an element of the data code.

Control station 101 is also provided with poll initiation unit 108 and start code converter 110. Poll initiation unit 108 is also a code generator which, when enabled at its input E terminal, provides to its output CODE terminal the polling initiation code and concurrently provides a pulse to its output P terminal. Start code converter 110 is arranged to accept a code from poll unit 109, convert the poll code when provided to input terminal E to a corresponding start code and apply this code to output terminal CODE, concurrently applying a pulse to output terminal P.

Control station 101 also includes regular message store 116 which is arranged to accept a poll code at input terminal CODE and provide that code to output terminal O. In addition, regular message store 116 indicates to idle output terminal I when a code is stored therein and is cleared when an energized pulse is applied to input terminal C. Last station store 115 is also arranged to store a poll code.

Also included in control station 101 is message pickup indicator 122, which is set by a pulse applied to input terminal S and in the set condition enables gate 124. Thereafter message pickup indicator 122 may be cleared by a pulse applied to input terminal C.

Message reception unit 104 is arranged to receive and record data from lead 103 when enabled by a pulse from gate 135. Reception unit 104 is suitably arranged to disable itself in response to an end-of-transmission signal received from lead 103.

Control station 101 also includes input code translator 105, which accepts data codes from lead 103 and pulses its several output leads in accordance with the data code applied thereto, as described hereinafter. Control station 101 further includes, as shown in FIG. 2, assembler/disassembler 220, encoder 222 and decoder 221. Encoder 222 accepts parallel data elements from lead 112 and applies them to the disassembler portion of assembler/disassembler 220. The disassembler, in turn, shifts the code elements out serially to line 203. It is noted that the disassembler may be arranged to concurrently accept two or more data characters.

The assembler portion of assembler/disassembler 220 accepts the incoming serial character elements from line 202, applies them in parallel to decoder 221, which in turn passes them out, a character at a time, to lead 103.

All of the line stations, such as line stations 204 and 205, are arranged in substantially the same manner. Each line station contains a terminal attendant set, such as set 209, indicated in line station 204. This set includes a data source for sending data to output terminal SEND DATA and a data sink for accepting data from the input terminal monitor when an enabling signal is applied to the input terminal SELECT. In addition, this set includes various keys and lamps whereby the attendant may operate a particular key or keys to indicate that a priority or regular message is available for transmission. With any message available the output lead REQUEST is thus energized. If the message is a priority message the output PRI lead is also energized.

Line station 204 also includes input selector 210 and output selector 212, each of which normally passes data from its input "1" terminal to the output thereof. In the event, however, that the SW input terminal is energized, the particular selector will pass the data from the input "2" terminal to the output thereof.

Line station 204 also includes character detector generator and store 208, which is arranged to accept serial data at terminal IN, accept parallel data from input leads PRI, REG and NAK and pass serial data to terminal OUT thereof concurrently applying energizing signals to several output leads when specific codes are stored therein. Preferably, character detector generator and store 208 includes a shift register having a sufficient number of stages for storing the elements of at least one data character, together with input networks for coding the stages wtih predetermined code characters and output networks for detecting predetermined code characters when stored in the several stages. Line station 204 also includes logic units, such as polling logic 215 and select-to-transmit logic 216. These provide various output signals in response to various permutations of input signals, as described in detail hereinafter.

Assuming now that the system is in the message pickup state and one of the outlying line stations, such as line station 204, is sending a message to control station 101 by way of data transmission line 201, the data characters are applied to control station 101 by way of incoming lead 202 and assembled by the assembler portion of assembler/disassembler 220 which, in turn, applies the elements of the data characters in parallel to decoder 221.

Decoder 221, in turn, passes each data character by way of lead 103 to message reception unit 104 which is enabled in the message pickup state to record the message, as described hereinafter. In addition, the data characters are passed by decoder 221 to input code translator 105, which is looking for the end-of-transmission character.

At the termination of the message the outlying line station sends the end-of-transmission character, which is recognized by message reception unit 104, resulting in the blinding of the unit to incoming data. In addition, the end-of-transmission character is detected by input code translator 105. Code translator 105, in turn, applies an enabling signal to output terminal EOT, thus passing a pulse to the clear input of message pickup indicator 122 and concurrently applying an enabling pulse to AND gate 124. During the message pickup interval, message pickup indicator 122 is in the set condition, as described hereinafter, whereby the output thereof is passing an enabling condition to gate 124. Accordingly, with both inputs to gate 124 enabled, a pulse is passed therethrough. Accordingly, the detection of the end-of-transmission character by input code translator 105 enables gate 124 and clears message pickup indicator 122.

The enabling of gate 124 passes an enabling pulse to both poll initiation unit 108 and transfer gate 125 and passes a clearing pulse to regular message store 116. The application of the clearing pulse to regular message store 116 clears out the identity of any line station stored therein since a new polling sequence is to be initiated. The application of an enabling pulse to transfer gate 125 passes the code at the output of poll unit 109 to the last station store 115. Since the last station polled is necessarily the station which has just delivered a message, last station store 115 accordingly stores the identity of that station. Finally, the enabling of poll initiation unit 108 results in the application of the poll initiation code to encoder 222 by way of code lead 112, whereby the poll initiation code is encoded on the disassembler portion of assembler/disassembler 220 and then passed to data transmission line 201.

At an outlying station, such as line station 204, the incoming data character is received from line 201 and applied to input terminal "1" of input signal selector 210. The character is thus passed to clock and sampler 214, which repeats the data character to the input terminal of character detector generator and store 208. The poll initiation code is recognized by detector 208, energizing output terminal PIC. An enabling pulse is thus passed to input terminal E of polling logic 215, whereby the unit is prepared to operate in response to its polling code, as determined by the availability of a message, as described hereinafter. In addition, the enabling of polling logic 215 passes an enabling pulse to select-to-transmit logic 216 to enable the latter unit to respond to signals from store 208. Thus, the polling state is initiated and line station 204 is conditioned to look for its poll code.

At control station 101 the enabling of poll initiation unit 108 also results in the application of an enabling pulse to output terminal P. This pulse is applied through delay unit 126 to provide sufficient delay for the transmission of the poll initiation code prior to the operation of poll unit 109 since the pulse is thereafter passed through OR gate 127 and thence to input SEND ENABLE of poll unit 109 and to input STEP of the poll unit by way of OR gate 130.

In response to the pulsing of input STEP, poll unit 109 steps to the position corresponding to the next sequential outlying station after the position corresponding to the outlying station which just delivered the message. The application of the pulse to input SEND ENABLE functions to apply the poll code of this next sequential station to output terminal SEND, thereupon passing the poll code by way of path 112 to encoder 222 and thence through assembler/disassembler 220 to data transmission line 201. Concurrently therewith, poll unit 109 pulses output terminal P, passing a pulse through OR gate 131 to the input terminal E of timer 132. This sets timer 132 to time a predetermined interval, for reasons described hereinafter.

At the outlying station the poll code is passed through input selector 210 to sampler 214 which applies the code to store 208. If the poll code does not correspond to the particular line station no further function is provided. At the line station corresponding to the poll code, however, store 208 recognizes the poll code and energizes output terminal SPC. This passes a pulse to input terminal A of polling logic 215 to activate the unit.

When activated, polling logic unit 215 examines the condition of input leads PRI and REQUEST to determine if a message is available and whether it is a priority message and thereupon energizes an appropriate one of output leads PRI, REG or NAK. In the event that a priority message is to be transmitted, both input leads PRI and REQUEST are energized and polling logic 215, when activated, energizes output lead PRI. With a regular message available lead REQUEST is energized and then activated poll logic 215 energizes output lead REG. Finally, if no message is available neither of leads PRI or REQUEST is energized and polling logic 215, in response thereto, energizes lead NAK. Accordingly, polling logic 215, in response to the activation thereof, energizes lead PRI if a priority message is available, energizes lead REG if a regular message is available, and energizes lead NAK if no message is available.

The energization of leads PRI, REG and NAK codes store 208 with corresponding data characters which indicate the availability of a message and whether the message is a priority message. Store 208, in turn, passes the particular one of the data characters through its output terminal to input terminal "1" of output signal selector 212 and thence back over data transmission line 201 to control station 101.

Returning now to control station 101, in the event that the polled station has a priority message to send, the priority code is returned by way of assembler/disassembler 220 and decoder 221 to input code translator 105. Output terminal PRI of code translator 105 is thereby energized. Simultaneously, the reception of the code by decoder 221 provides a reset pulse to timer 132 to terminate its operation before its timeout. It is noted here that the reception of any code character by decoder 221 functions to reset timer 132.

Returning now to the energization of output terminal PRI of input code translator 105, OR gate 135, which is connected thereto, passes an enabling pulse produced thereby to message reception unit 104 whereby the unit is enabled to receive and record subsequent data signals. The enabling pulse at the output of OR gate 135 also sets message pickup indicator 122 to indicate the initiation of the message pickup interval. In addition, the pulse passed through OR gate 135 is also applied through delay unit 138 to transfer gate 140. Transfer gate 140, accordingly, passes the poll code stored in poll unit 109 to start code converter 110. The start code converter, in turn, converts the poll code to a transmitter start code individual to the line station corresponding to the poll code. Thus, enabled start code converter 110 passes the start code together with an end-of-poll code to encoder 222 and by way of assembler/disassembler 220 to data transmission line 201. In addition, start code converter 110 applies a pulse by way of its output terminal P through OR gate 131 to again set timer 132.

At the outlying station the transmitter start code, together with the end-of-poll code, is passed through selector 210 and applied by sampler 214 to store 208. At the several stations which are not to be selected by the start code, the end-of-poll code is recognized by store 208 and output terminal EOP is thus energized, passing a disabling pulse to polling logic unit 215. Thus, the polling logic unit 215 at each of the several stations is restored to the non-polling interval state wherein it no longer looks for its polling code.

At the line station to be selected the end-of-poll code is similarly recognized to drop polling logic unit 215 to the non-polling state. At this line station, however, the start code individual thereto is also recognized, applying an energizing pulse to output terminal SSC of store 208. This pulse is passed to select-to-transmit logic 216, which proceeds to apply an enabling signal to the select terminal of attendant set 209. Accordingly, as previously described, the data transmitter therein proceeds to apply data to the send-data terminal and monitor incoming data from the monitor lead.

Select-to-transmit logic 216 also passes a switching pulse to selectors 210 and 212 whereby the selectors are switched to accept data from input terminal "2". Accordingly, transmitted data from attendant set 209 passes from terminal SEND DATA to input terminal "2" of input selector 210 and thence by way of clock and sampler 214 to the monitor input of attendant set 209 and to input terminal "2" of selector 212. Selector 212, in turn, passes the data to data transmission line 201. Accordingly, the data message is sent to control station 101.

At control station 101 the incoming data message is recorded by message reception unit 104 and the first character received resets timer 132. The message is thus recorded until terminated by the end-of-transmission code. Thereupon, message reception unit 104 blinds itself to further transmission and the end-of-transmission code is recognized by input code translator 105 to start a new poll interval, whereupon the prior sequence is repeated with the exception that the poll unit is stepped to the next outlying station in the sequence.

At the outlying station, during the transmission of the message text, the data characters are fed by sampler 214 to output signal selector 212 and then to data transmission line 201 and, in addition, to the monitor input of terminal attendant set 209, as previously described. In addition, the data characters from sampler 214 are fed to the input terminal of store 208. When the end-of-transmission character is detected by store 208, output terminal EOT is energized. This is passed on to select-to-transmit logic 216, restoring the logic unit to its initial condition. Selectors 210 and 212 are thus switched back to their first state and the enabling signal on the select lead is removed to stop the data transmitter and restore attendant set 209 to its initial condition.

Assuming now that, during the polling cycle, in response to the poll code the outlying station, such as station 204, responds that a regular message is available by returning the regular message code, timer 132 is reset, as previously described, and the code indicating that a regular message is available is applied to input code translator 105. This energizes output terminal REG, which passes an enabling signal to transfer gate 142 and to gates 145 and 146 by way of OR gate 144.

Considering first the enabling of gate 142, in the event that the idle output lead of the regular message store is also energized, indicating that the store is empty, transfer gate 142 is enabled to pass the poll code stored by poll unit 109 therethrough to the input of regular message store 116. Since this poll code corresponds to the outlying station which has responded that a regular message is available, regular message store 116 thus stores the identiy of the outlying station having the regular message. At this time the idle lead goes to the disabling condition, since the poll code is now stored in regular message store 116.

Considering now gate 146, it is seen that one input comprises a NOT or inverting lead, as indicated on FIG. 1 by a dot connecting the lead to the input of gate 146. This lead extends to the output of comparator 119 and functions to enable gate 146 when comparator 119 provides a negative or disabling condition. As described hereinafter, comparator 119 provides an enabling signal at the output thereof after the conclusion of a full cycle of polling without picking up a priority message. Assuming that the response of the outlying station that a regular message is available occurs in the middle of a polling cycle rather than at the conclusion, as described above, then the output of comparator 119 is provided with a disabling signal which, in turn, results in the application of an enabling signal to gate 146. Since the other lead to gate 146 is also enabled by way of OR gate 144, as previously described, gate 146 passes an enabling pulse through OR gate 127 to the SEND ENABLE input of poll unit 109 and to the step input thereof by way of OR gate 130. Accordingly, as previously described, poll unit 109 steps to the position corresponding to the next succesive station and generates the poll code for that station, passing it on to encoder 222.

Accordingly, during the polling cycle, if an outlying station responds that a regular message is available, the station's identity is stored in regular message store 116 in the event that a prior identity is not stored therein and, in addition, control station 101 proceeds to poll the next successive outlying station without starting the station with the regular message.

Assuming now that the outlying station has responded that no message is available, the detection of this code by input code translator 105 results in the energization of output terminal NAK. This passes a pulse through OR gate 152 to AND gate 153 and to OR gate 144. The pulse through OR gate 144 is applied to gates 145 and 146. It is recalled that if this polling is in the middle of a cycle, gate 146 is enabled and the application of the pulse thereto results in poll unit 109 polling the next successive station. Thus, this next successive station is polled when an outlying station responds that a regular message or no message is available and this response occurs in the middle of the polling cycle.

Considering now the enabling of gate 153, the other input lead of gate 153 extends to the idle output lead of regular message store 116. Accordingly, gate 153 is enabled by the idle output lead of store 116 when no code is stored therein, i.e., when no prior station has responded that a regular message is available. The output of gate 153 extends to OR gate 127, whereby the enabling of gate 153 operates poll unit 109, as previously described, to enable control station 101 to poll the next successive station. Thus, when an outlying station responds that no message is available and, in addition, no prior station has responded that a regular message is available, control station 101 proceeds to poll the next successive station even though it may have completed a polling cycle.

Comparator 119 determines when a polling cycle has been completed without picking up a priority message. One input to comparator 119 extends from the output of last station store 115 while the other input is connected to the output code terminal of poll unit 109. It is recalled that last station store 115 stores the poll code of the last station which has delivered a message. It is further recalled that the output code terminal of poll unit 109 provides the poll code of the station which is presently being polled. Accordingly, if these two codes are identical, i.e., the poll code and the last station store code, as determined by comparator 119, then poll unit 109 has completed a polling cycle without picking up any message. In response thereto the output of comparator 119 is energized, thereby disabling AND gate 146 and enabling AND gate 145.

Assuming now that with the polling cycle completed without picking up a priority message, the outlying station responds that either a regular message is available or that no message is available. This provides an energizing pulse to OR gate 144, as previously described. This, then, enables a second lead of gate 145. If it further be assumed that the last polled station has responded that a regular message is available, then the identity of that station is stored in regular message store 116 and a disabling signal is provided to its idle output. Since the idle output extends to the inverting or NOT input of gate 145, the three inputs thereof are providing enabling signals and gate 145, in turn, provides enabling signals to transfer gate 148 and to OR gate 135.

The application of an enabling signal to transfer gate 148 operates to transfer the poll code stored in regular message store 116 to one input of comparator 120. The other input of comparator 120 is connected to the output code terminal of poll unit 109. Accordingly, if the station that is presently being polled is the only station to return an indication that a regular message is available, the poll code is stored in regular message store 116, the same poll code is provided to the output code terminal of poll unit 109, the identical codes are compared and an enabling signal is provided at the output of comparator 120 to inverter 150. This is converted to a disabling signal by inverter 150 and the disabling signal is passed by way of OR gate 130 to the input step terminal of poll unit 109 to provide the function of holding poll unit 109 at its present position.

Concurrently therewith, the enabling of gate 145 passes an enabling signal through OR gate 135, as previously described, whereby message pickup indicator 122 is set to start a message pickup interval, message reception unit 104 is enabled to receive the subsequent data message and transfer gate 140 is enabled by way of delay unit 138 to pass the poll code to start code converter 110, as previously described. Since poll unit 109 is being maintained at the position corresponding to the poll code in regular message store 116, the start code of this station is transmitted to data transmission line 201 and the regular message is thus picked up in the same manner as the pickup of a priority message. Thus, the regular message is picked up from the station and a new polling cycle is initiated after the end-of-transmission signal is received in the same manner as a new polling cycle is initiated after the end of a priority message.

Assuming now that a station polled in the middle of a cycle responded that a regular message is available, the poll code stored by regular message store 116 is not the code of the last station polled and the codes applied to comparator 120 will not be identical. Comparator 120 thus provides a disabling signal at the output thereof to inverter 150. Inverter 150 converts the signal to an enabling pulse and passes it by way of OR gate 130 to the input step terminal of poll unit 109. Poll unit 109 is thus stepped to the position corresponding to the next successive outlying station in the polling cycle. This supplies another polling code to the output code terminal of poll unit 109 and thus to comparator 120, whereupon a new comparison is made. If the new comparison does not check then a new step pulse is passed through OR gate 130, poll unit 109 is again stepped, a new code is passed by poll unit 109 to comparator 120, and another comparison is made. This cycle is continued until the position of poll unit 109 reaches the poll code of the station which is identified in regular message store 116. Thereupon, comparator 120 provides an enabling signal output to inverter 150, inverter 150 passes a disabling signal to OR gate 130 precluding further stepping of poll unit 109 and the position of poll unit 109 is fixed at the poll code corresponding to the identity of the station with the regular message.

Concurrently therewith, as previously described, AND gate 145 passes an enabling pulse through OR gate 135, unblinding message reception unit 104 and setting message indicator 122. In addition, transfer gate 140 is enabled by way of delay unit 138. It is noted that delay unit 138 provides sufficient delay to enable the cycling of poll unit 109 until a comparison is effected with the code in regular message store 116. Thus the poll code of the station having the regular message is passed by way of transfer gate 140 to start code converter 110, thereby starting the station transmitter to send the regular message, as previously described. Finally, at the conclusion of the regular message, the reception of the end-of-transmission character starts a new polling cycle in the same manner as the reception of the end-of-transmission character from a priority message.

The function of timer 132 is to insure that the polling sequence is not interrupted when an outlying station fails to respond to its poll code or start code. Assuming, for example, that an outlying station is polled and fails to respond, timer 132 is set to time out by the output pulse from output terminal P of poll unit 109, and, with no response from the outlying station to reset the timer, it times out, passing an enabling pulse from output terminal O to OR gate 152. Similarly, if a start code is transmitted to an outlying station, timer 132 is set to time, as previously described, and times out if the message is not returned from the outlying station to reset timer 132. In either event, the time out of timer 132 passes a pulse through OR gate 152 and the output from OR gate 152 functions to advance the polling sequence in the same manner as a no-message response from an outlying station.

Although a specific embodiment has been shown and described, it will be understood that various modifications may be made without departing from the spirit of this invention.

What is claimed is:

1. In a multistation line transmitter selection system, a plurality of station message transmitters, a master controller for selectively polling each station for message traffic, means at each station responsive to said polling of said station for sending data indicating availability of priority and regular messages and further means for starting the message transmitter thereat in response to the reception of a start code individual thereto, characterized in that said master controller includes first means for sending the start code of each station in response to data therefrom indicating availability of a priority message, means for memorizing the identity of any station in response to data therefrom indicating availability of a regular message and other means responsive to said memorizing means for sending the start code of said station having a regular message available after all stations have transmitted the priority messages.

2. In a multistation line transmitter selection system in accordance with claim 1, wherein said first start code sending means includes means enabled in response to said data indicating availability of a priority message for reading the polling code provided by said master controller and means for converting said polling code to a corresponding start code.

3. In a multistation line transmitter selection system in accordance with claim 1 wherein said memorizing means includes storage means and means enabled in response to said data indicating availability of a regular message for transferring the polling code provided by said master controller to said storage means.

4. In a multistation line transmitter selection system in accordance with claim 3 wherein said other start code sending means includes means responsive to the polling code transferred to said storage means for sending a corresponding start code.

5. In a multistation line transmitter selection system in accordance with claim 4, wherein said other start code sending means further includes means for detecting a full cycle of station pollings and means enabled by said detecting means for reading said polling code previously transferred to said storage means.

6. In a master controller of a multistation line transmitter selection system for selectively polling outlying station transmitters for message traffic and starting said station transmitters, code generator means capable of sending a sequence of poll codes one at a time and capable of sending a start code individual to each poll code, means responsive to a response of a first kind to the sending of a poll code for enabling said code generator to send the start code individual thereto, means responsive to a response of a first kind to the sending of a poll code for storing the identity of the station selectively polled thereby, and means operable after a cycle of said poll code sequence for enabling said code generator to send the start code individual to the poll code corresponding to the stored station identity.

7. In a master controller in accordance with claim 6 wherein other means are responsive to said response of another kind to the sending of a poll code for enabling said code generator to send the next poll code in the sequence.

References Cited

UNITED STATES PATENTS

| | | | |
|---|---|---|---|
| 2,871,286 | 1/1959 | Bacön et al. | 178—2 |
| 3,001,010 | 9/1961 | Mahony et al. | 178—2 |

EUGENE G. BOTZ, *Primary Examiner.*

U.S. Cl. X.R.

178—17.5; 340—163